(12) United States Patent
Banerjee et al.

(10) Patent No.: US 9,104,682 B2
(45) Date of Patent: Aug. 11, 2015

(54) METHOD AND APPARATUS TO ELEGANTLY AND AUTOMATICALLY TRACK EMAILS AND ITS ATTACHMENTS FOR ENHANCED USER CONVENIENCE

(75) Inventors: Dwip N. Banerjee, Austin, TX (US); Sandeep Ramesh Patil, Maharashtra (IN); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2133 days.

(21) Appl. No.: 12/173,438

(22) Filed: Jul. 15, 2008

(65) Prior Publication Data
US 2010/0017404 A1    Jan. 21, 2010

(51) Int. Cl.
*G06F 7/00* (2006.01)
*G06F 17/30* (2006.01)
*G06Q 10/10* (2012.01)
*G06F 15/16* (2006.01)

(52) U.S. Cl.
CPC ............ *G06F 17/3012* (2013.01); *G06F 15/16* (2013.01); *G06F 17/30* (2013.01); *G06Q 10/107* (2013.01)

(58) Field of Classification Search
CPC ...... G06Q 10/107; G06Q 10/10; H04L 51/08; H04L 51/22; H04L 51/34; H04L 51/36; G06F 17/30115
USPC ................................. 707/602, 694, 758, 804
See application file for complete search history.

(56) References Cited

U.S. PATENT DOCUMENTS

| | | | |
|---|---|---|---|
| 7,051,147 B2 | 5/2006 | Hoese et al. | |
| 8,631,079 B2 * | 1/2014 | Affronti et al. | 709/206 |
| 2002/0095454 A1 * | 7/2002 | Reed et al. | 709/201 |
| 2002/0138582 A1 * | 9/2002 | Chandra et al. | 709/206 |
| 2003/0115273 A1 * | 6/2003 | Delia et al. | 709/206 |
| 2003/0126463 A1 | 7/2003 | Sistla | |
| 2004/0068545 A1 * | 4/2004 | Daniell et al. | 709/206 |
| 2005/0267941 A1 | 12/2005 | Addunte et al. | |
| 2006/0155810 A1 | 7/2006 | Butcher | |
| 2006/0259559 A1 | 11/2006 | Sullivan et al. | |
| 2007/0011258 A1 * | 1/2007 | Khoo | 709/206 |
| 2007/0180035 A1 * | 8/2007 | Liu et al. | 709/206 |
| 2007/0185970 A1 * | 8/2007 | Arenburg et al. | 709/217 |
| 2008/0177994 A1 * | 7/2008 | Mayer | 713/2 |

* cited by examiner

*Primary Examiner* — Mariela Reyes
*Assistant Examiner* — Linh Black
(74) *Attorney, Agent, or Firm* — David A. Mims, Jr.; Darcell Walker

(57) ABSTRACT

An automated, embedded & intelligent E-mail Attachment Document manager automatically tracks email and their associated attachments and assists users in locating an email message (email-chain/thread) that is the original source from where the email attachment document. The present invention can perform the tracking action using the given name of the saved attachment file.

18 Claims, 9 Drawing Sheets

| Attachment Tracking | | |
|---|---|---|
| View All  Search  Modify | | |
| View All Entries | | |
| Attachments | Email Links | |
| C: My Documents\AIX\Design.html | ○ | |
| C: My Documents\AIX\AIXFVT.doc | ☐ | |
| C: My Documents\NAS\help.doc | ☐ | |
| C: My Documents\NAS\admin.pdf | ☐ | |
| C: My Documents\song.zip | ☐ | |
| C: My Documents\riya_pic.jpg | ☐ | |

Clicking this document link will directly open the email from where the attachment named Design.html originated

FIG. 3a

METHOD AND APPARATUS TO ELEGANTLY AND AUTOMATICALLY TRACK EMAILS AND ITS ATTACHMENTS FOR ENHANCED USER CONVENIENCE

FIELD OF THE INVENTION

The present invention relates to the retrieval of electronic mail messages and in particular to a method and system for detecting when an email message has an attached document, detecting when a user is attempting to download an attached document and creating links within the downloaded document that identifies the email source of the downloaded and attached document.

BACKGROUND OF THE INVENTION

In today's corporate environment electronic mail (email) systems are being intensively used as the official communication tool. Emails are used to communicate with friends, relatives, colleagues and also officially being used to communicate with customers. Email attachment features are some of the most essential features in the emailing world and probably the most exploited feature. When using this feature, users can send all types and kind of file along with the email, by attaching the file in the email. These attachments are popularly known as Email Attachments. Email attachments are heavily being used for business interactions as well. Gaining such an importance, the completeness of the email system (including the Email attachment feature) to address all kind of possible scenarios becomes very vital. Below described is one such manifestation, which is vital, commonly encountered and still not addressed by any of the email systems.

In this world of emails there exists set of users who get a lot of email attachments (including me) representing design documents, pictures, movie clips, customer proposals etc. Most of us store these email attachments in our local computer hard disk (generally in "My documents" folder in the windows world) for a later access and reference. After saving the attachment in local hard disk some users may keep the attachment as-is in the email while some will delete it from the email copy. Later (where later can be any amount of time period, can be 1 day or even 1 year or more) when the user refers to the detached email attachment lying on his/her harddisk, many-a-times there is a need for the user "wanting to" or "having to" refer to the email from where this attachment was detached. In the current system either the user needs to remember/recollect as to who had send this email or when was it received etc and then keep digging his/her ever growing email archives to get hold of the email/email-chain/email-thread associated with that attachment. Many times this is a cumbersome process and if the email is about a year old or more then it becomes even more difficult to locate the email associated with the attachment. An actual user's personal experience is as follows: "A user was referring to a design document which the user had received a year back (as an email attachment) from someone in the AIX Security team (whose name/email ID the user could not recollect). The user vaguely remembered that the email associated with this attachment had some more information on the design, which was written as a part of the email text. There was a strong need for the user to refer to the email associated with the design document (email attachment) the user was referring to, as the user wanted to know who had send the attachment (who all wee in the cc list) and what was the additional design details mentioned in the email body. It took me about 15-20 minutes for the user to manually dig out that particular email (email-chain) from my every growing email archive. The process and time taken was pretty annoying and cumbersome."

This scenario is a very frequently encountered scenario with most of the people where people want to refer to emails associated with the detached attachment, in later period of time. Hence there is a need to have a mapping between email attachments stored locally (on the personal PC) and the email/email-chain/email-thread it originated from, such that the user on a single click can open the email associated with the attachment he/she is referring to (irrespective of its age). The proposed solution in this disclosure addresses the stated problem elegantly and greatly enhances the user convenience of the system to locate and open email associated with the detached email attachment at a single click.

One could argue that one of the existing solutions is to use the search facility to find for the attachment name in the entire email archives But with large archives, this really is not so neat and consumes a lot of time (as in the above mentioned case, I did the same to locate the email). Also in cases where the user has manually edited/deleted the attachment from the emails, this particular solution does not work at all. Hence there is clearly a problem of user convenience, performance and reliability in this approach. Apart, there are many patents associated with the Management of Email and email attachment, but none of them address the stated problem. Following are few patents, which talk on email attachment and their management but do not qualify to be prior arts as they are addressing totally different problem (and do not address/cover the above stated problem at all).

U.S. Pat. No. 7,107,276 to Johnson describes a uniform identifier record has a unique identifier field and a textual identifier field. The unique identifier field may comprise a uniform resource locator. In one embodiment, adding a constant value to a last prior unique identifier creates the unique identifier. The textual information is a user-friendly string identifying the file. In applications where the file identified by the uniform identifier record is associated with a separate file, the uniform identifier record is appended to the associated file.

U.S. Pat. No. 7,113,948 to Jhingan et al. describes a file delivery system for transmitting files to recipients using email, which may be used with existing email infrastructures. High volumes of large file attachments may be handled by routing attachments independent of an associated email. An attachment distribution system extracts the attachments of emails at mail servers and routes them through a hosting server thereby alleviating server loading on the mail server. The system may be configured for delivery optimization, recipient authentication and delivery confirmation. The system examines emails flowing through a distributed network of mail servers, and may invoke attachment extraction based on configurable rules like attachment size and sender validity, and move the attachments over the Internet or Intranet to a remote server that is capable of delivering the attachments to the email recipients.

U.S. Pat. No. 7,155,481 to Prahlad et al. describes an e-mail management system that includes an e-mail browser having a time variance interface that provides for storage into a storage media of e-mail messages that have been received over time. The time variance interface of the e-mail browser also provides for retrieval, from the storage media, of the e-mail messages corresponding to a user specified date. The retrieved e-mail messages each include an indication of the presence of an accompanying attachment(s) in the e-mail message. An affirmative indication provides the user with an option of retrieving content of the attachment(s) from the storage media such that the e-mail browser only when specifically requested by the user retrieves the content of the attachment(s).

U.S. Patent Application No. 20060031309 to Luoffo et al describes a method for email attachment management. An email is received. The email is scanned to detect an attachment. If the email contains an attachment, the attachment is detached from the email. The detached attachment is stored in a storage location on a storage medium. The email is modified to include a link, the link at least identifying the storage location and the modified email is stored.

There remains a need for a method and system that has the capacity to identify and track email message attachments to the original message and location of the attachment document.

SUMMARY OF THE INVENTION

The novel and unique idea in this disclosure is to have automated, embedded & intelligent E-mail Attachment Document manager, which will automatically track email and their associated attachments and will assist users to locate email (email-chain/thread) from where the attachment originally came from, given the name of the saved attachment file. It derives high user convenience and usability benefits with (What is this Question 1 and how does it reflect in the Summary. This will need rectification)

In the method of the present invention, first, there is a determination of whether an email message has a document attached to it. When there is an attached document, the method detects the selection of this document by the user. When there is a selection of the document, the user either wants to open or save the document. At this point, the user is prompted to select whether or not to save or open the attached document. When the user selects to save the document, a document file is created. Information about the email message that contains the attached document and the location where the attachment was saved is stored in the document file. The document file is then saved. The document file links the saved attachment to the original email message. When the user wants to open the attached document, the document file is first opened. The user also has the option to further save the opened document to another location. If the user decides to save the opened attachment document, again a document file is created containing information about the email message that initially contained the attachment document and the new location of the attached document. This new document file is saved in a database.

BRIEF DESCRIPTION OF THE DRAWINGS

FIG. 3 is a display of attachment records stored in a database location for a user containing the name of the attachment and a document link to a corresponding email message from which the attachment was downloaded.

DETAILED DESCRIPTION OF THE INVENTION

The embodiments of the present invention will be presented using IBM Lotus Notes software as example email software in which the present invention can be implemented. In IBM Lotus Notes, every email is treated as an independent document. IBM Lotus Notes supports creation of a document link, which acts as a shortcut to directly get to that particular document. Since every email is also treated as an independent document by Lotus notes, having a document link for every email is every much a well known art. Basically, IBM Lotus Notes document link creation is based on the OLE technology. OLE stands for Object Linking and Embedding. OLE programming allows developers to programmatically manage and identify links of objects (http://en.wikipedia.org/wiki/Object_Linking_and_Embedding). IBM Lotus Notes uses OLE programming because other OLE based applications like Windows can also identify and make sense of Lotus notes document links. One can create a link to a Notes document or database by dragging the document or database into another application or to the Windows desktop, avoiding the need to copy and paste. With this knowledge it's a well known that having OLE based systems like Windows operating system and OLE based applications developed on it can understand/process and use the Lotus Notes documents (like email) links to directly open the document. The proposed solutions are based on this very concept.

Figure 1:
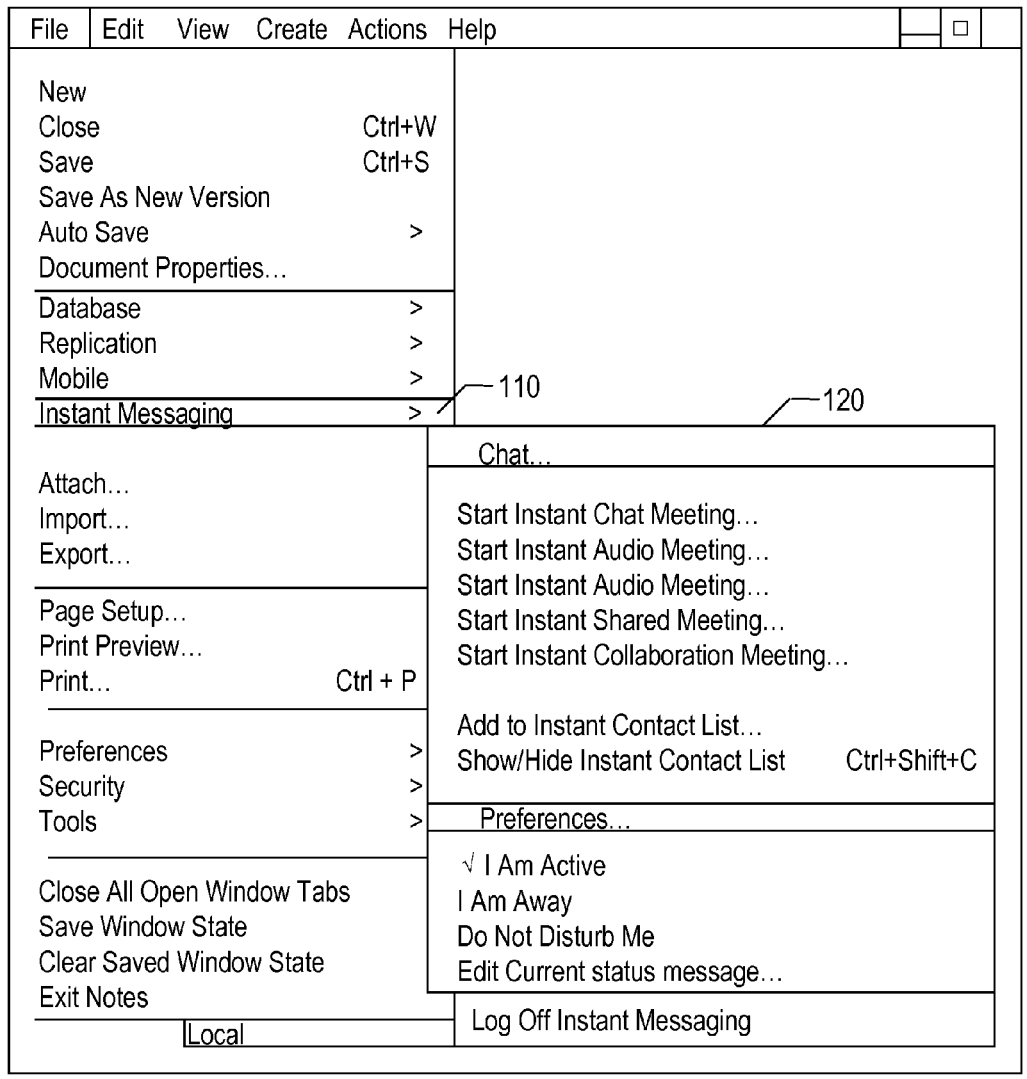
FIG. 1 is a view of a conventional display screen for a system having a built-in embedded instant messenger.

FIG. 1 shows a current display that can be enhanced to include the features of the present invention. This display shows an existing in-built embedded instant message applet of an instant messaging feature. The instant messaging option 110 produces a popup window 120 with various capabilities. The present invention can be included as a feature in the instant messaging capabilities of a system.

Figure 2:
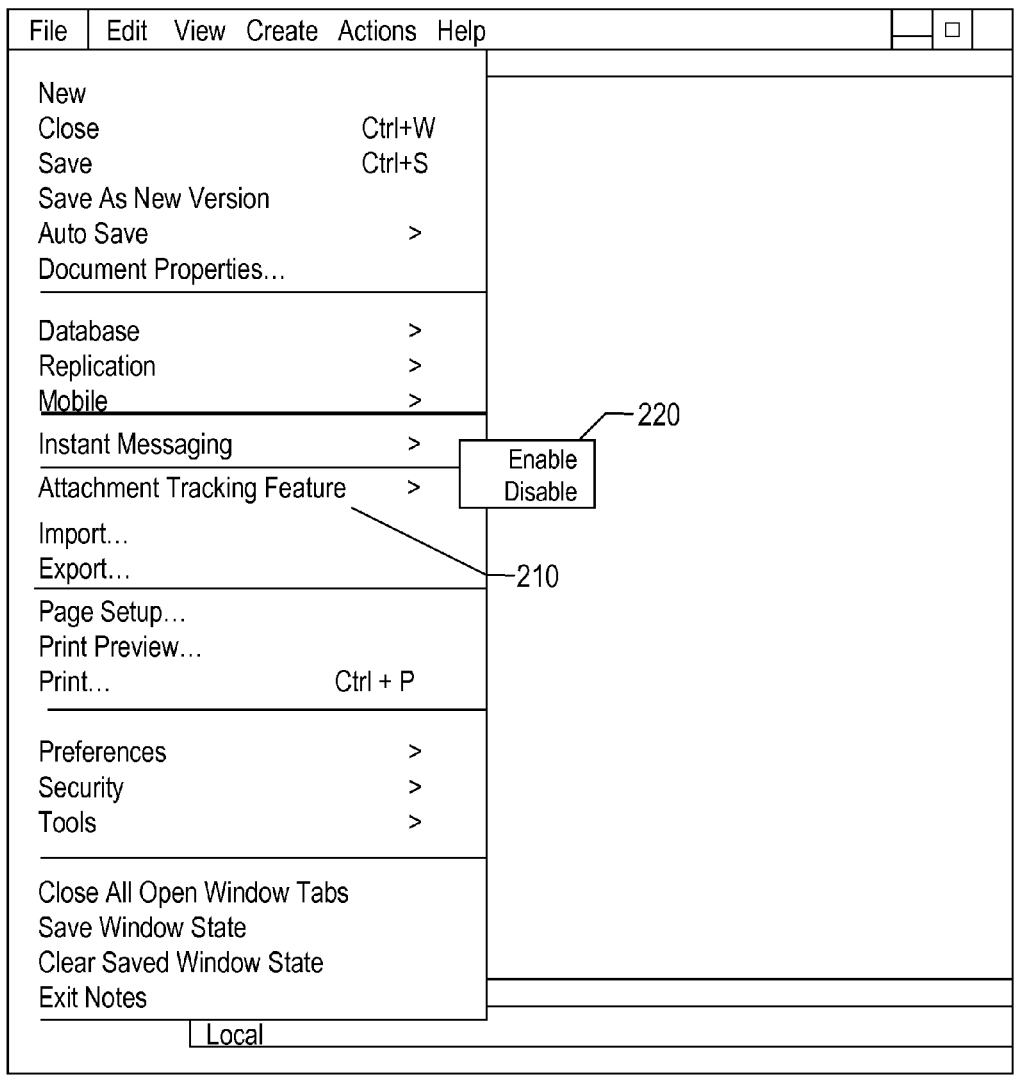
FIG. 2 is a view of a display screen for a system having a built-in embedded attachment tracking feature in accordance with the embodiments of the present invention.

FIG. 2 shows the proposed in-built embedded Attachment Tracking Applet for the present invention. The screen display in FIG. 2 shows an Attachment Tracking Feature 210 that can produce an enable/disable popup 220. The integrated and attachment tracking applet of the present invention can have the following functionality. The attachment tracking applet will always be automatically invoked/started whenever the email management software (hereinafter 'email software') is started and can also be manually invoked/started by users. It can optionally be enabled/disabled by the user via the email-client software as shown in FIG. 1.

Referring to FIG. 2, whenever the user saves an email attachment to the hard disk or any remote storage attached to the system, the email software client will automatically notify the Attachment Tracking Applet of the following information:

i) The attachment tracking software will create a document link of that email (in OLE format using the functionality it already possesses) and export it to the Attachment Tracking Applet.

ii) The name of the attached file and the disk-path/URL where the user saved the attachment will be notified to the Attachment Tracking Applet. If the user saved the attachment as a different file name, then even the new file name information will be passed on.

iii) Current System Date and Time (Optional)

iv) Emails receiving date and time (Optional)

The OLE aware Attachment Tracking Applet will store the above information together in a persistent storage as a single record. The information can either be stored sequentially in as a table record in RDBMS or even as a single entry in a Lotus Notes based database file (*.nsf). In the Running mode, the Attachment Tracking Applet will present user with two types of display panels.

One type of panel shows the list of all attachment information and the associated email document link that has been recorded by the applet (as shown in FIG. 3a), such that when the user clicks on document link it will directly open the link thus resulting in opening the email from where the attachment originated. FIG. 3a displays a proposed attachment tracking applet showing all records. The user can select from these records to view, search or modify a record. This display is connected to the editing capabilities described in FIG. 7. The name of the attachment and a document link to the corresponding email document from where the attachment is downloaded are displayed. When the user clicks the link, it directly opens the email. Also, alternatively if the user clicks on the name of the attachment, the attachment document will be opened.

Figure 3B:
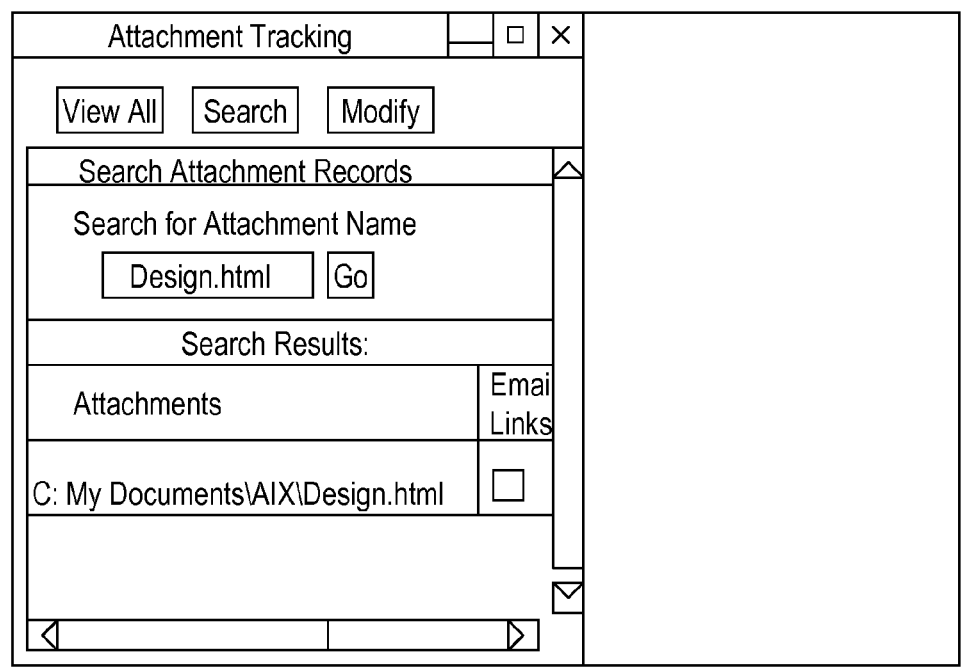
FIG. 3b is a view of a proposed attachment feature where the user is presented with a one-glance output containing a direct link to the email document from which the attachment originated.

FIG. 3b provides to the user the capability to search for the email link given the filename (with or without its full path/URL). On submission of the search the applet will use existing search algorithms to look for the closest matching records in its persistent storage and present the user with the matching records. The user can now view the search output (consisting of the email attachment name followed by the link to the email document from where it originated) and directly click on the link to open the email document, as shown FIG. 3b. The proposed attachment tracking applet in FIG. 3b shows the search facility, where the user enters (drag/drops) the name of the attachment and the software presents the user with a one glance output containing a direct link to the email document from where the attachment originated.

Whenever the user moves the email document within email management software (from one folder/archive to another) it will create a new document link and notify the Attachment Tracking Applet of its new link. If the user deletes/moves/renames the attachment file from the hard-disk, then the user needs to manually delete/modify the name of the attachment stored in the Attachment Tracking Applet. This activity can be atomized with the integration of the Attachment Tracking Applet with the operating system.

Figure 4:
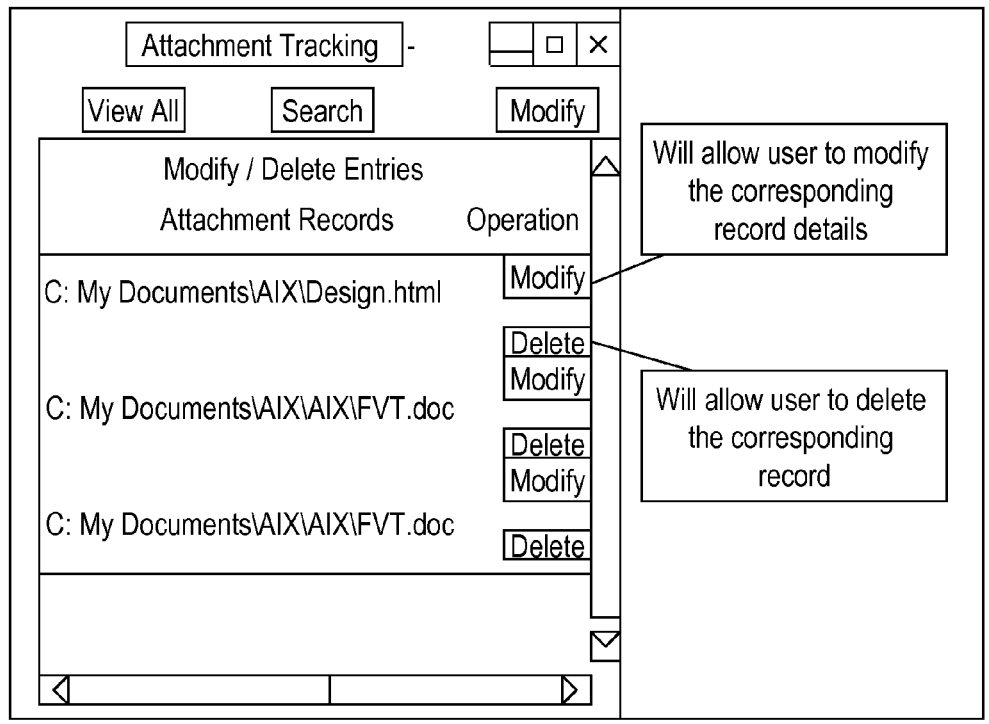
FIG. 4 is a view of a display of attachment records where the user is given options to modify or delete a record.

The attachment tracking applet will allow user to modify the entries, as shown in FIG. 4.

Figure 5:
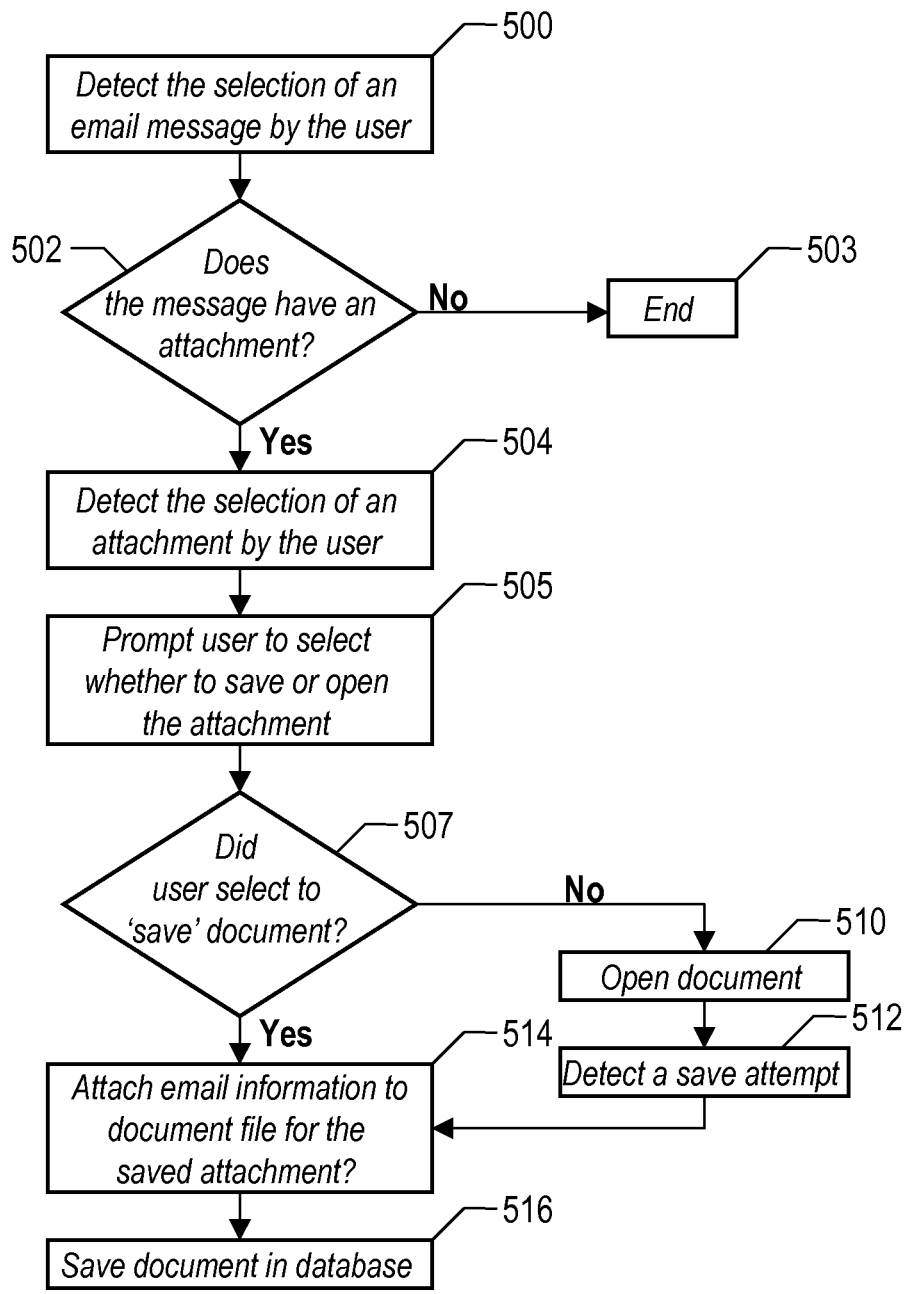
FIG. 5 is a flow diagram describing the general steps in the implementation of an embodiment of the method of the present invention.

FIG. 5 describes the main steps in an embodiment of the method of the present invention. After the user has activated the method of the invention, step 500 detects the selection of an e-mail message by the user. In step 502, there is determination of whether the e-mail message has a document attached to it. This step can make this determination by searching certain fields in the message for flags or other indications of a message. Currently, many email message messages have indicators such a paper clip icon on the message along with a name that is given to an attached document. The user will notice the paper clip and realize that a message is attached to the email message. In step 502, if the determination is that there is not an attachment, the method moves to step 503, which ends the routine of the present invention.

Referring again to step 502, when the determination is that the email message does have an attached document, the method moves to step 504, which detects the selection of the attached document by the user. This detection step is based on a determination that the user wants to view the document. There can be situation where the user does not want to view a document that is attached to the email message. Because this possibility exist, it is necessary in step 504 to determination whether the user has selected the attached document for review. Once the user has selected the document attached to the email, step 505 prompts the user to select whether to save or open the attachment. The user may prefer to view a document at that time. The user may also prefer to save the document to view at a later time. Step 507 determines whether the user has selected to save the document. If the determination is that the user did not select to save the document, step 510 opens the previously selected attached document. Once the user has reviewed the document, the method detects whether the user has attempted to save the document in step 512. At this point, the user can save the document attachment from the email message. This saving routine can include attaching information about the email attachment document to a document file. This document file can be specifically for documents that are attached to email messages. Once the step 514 attaches the information about the attached email document, step 516 saves the email attachment in a database.

Figure 6:
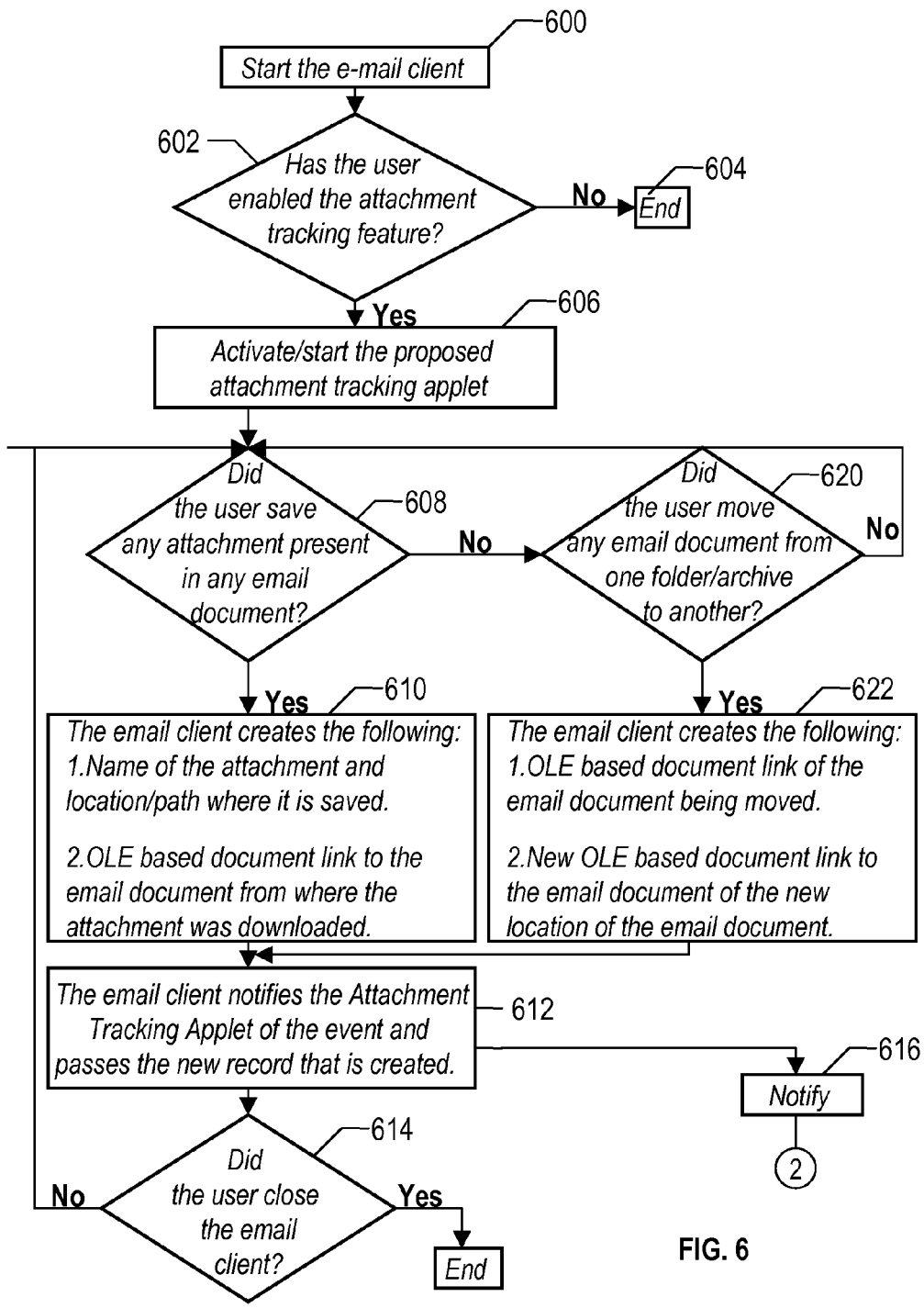
FIG. 6 is a flow diagram of steps in a detailed description of the implementation of an embodiment of the method of the present invention.
Figure 7:
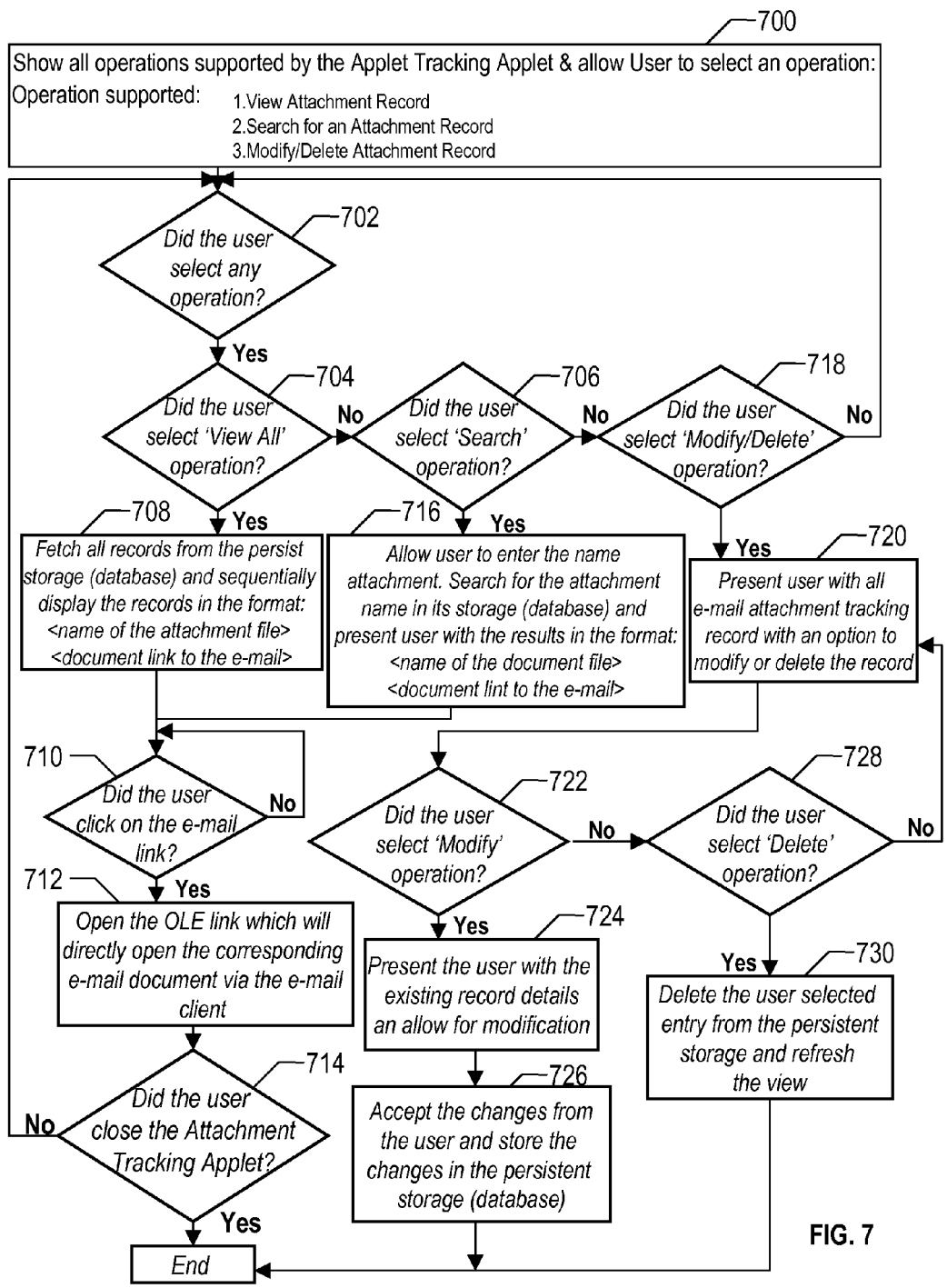
FIG. 7 is a flow diagram of a routine of the flow diagram of the method of FIG. 6, which gives the user the option of searching for, viewing or modifying an attachment document.
Figure 8:
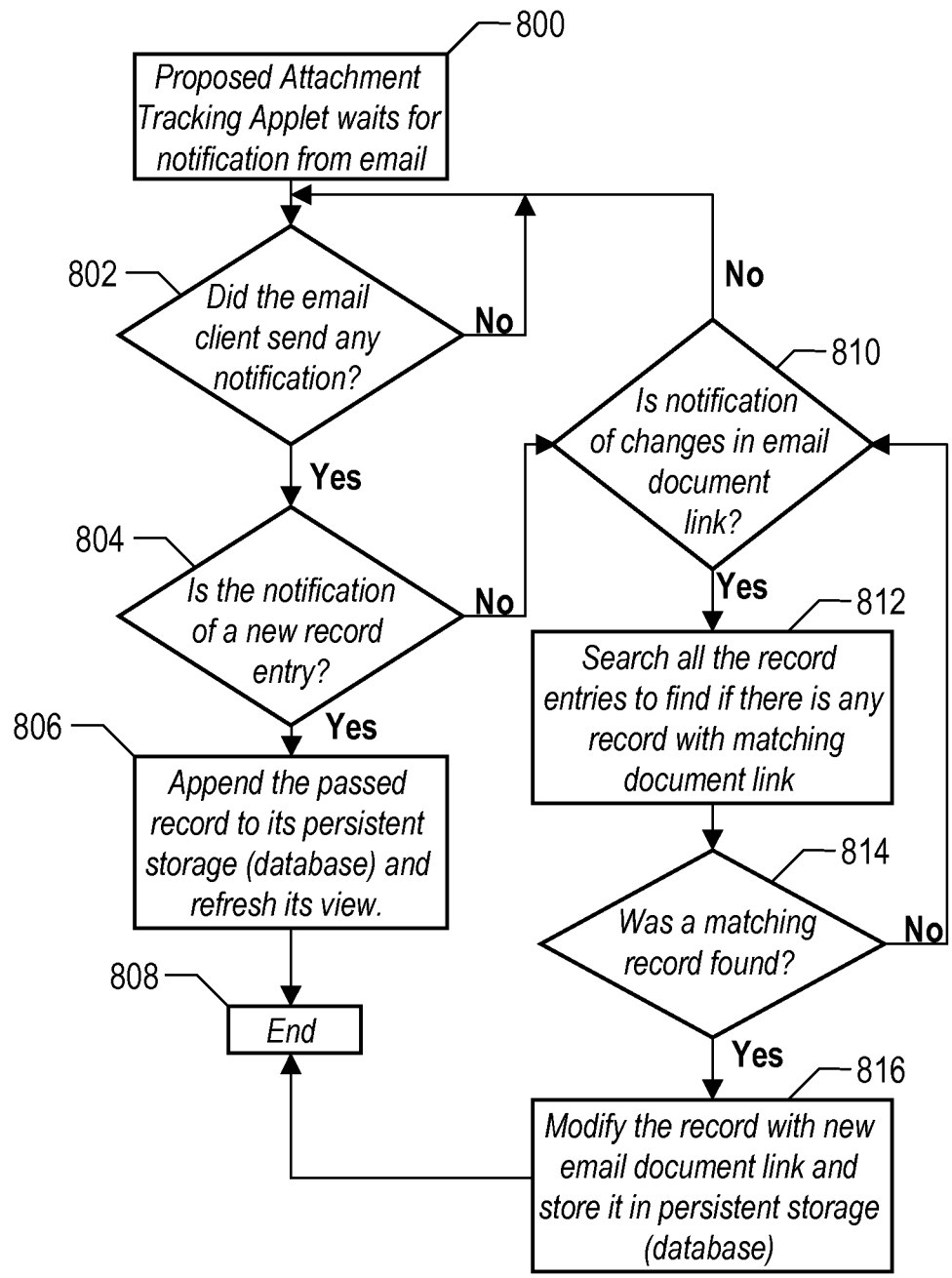
FIG. 8 is a flow diagram of a routine of the flow diagram of the method of FIG. 6, which notifies the user of a new attachment document.

FIGS. 6, 7 and 8 illustrate a flow diagram of a more detailed implementation of the method of the present invention. Beginning with FIG. 6, the initial step 600, of this method of the invention, initializes the e-mail client program of the present invention. Once initialized, step 602 makes a determination of whether the user has enabled the attachment tracking feature of the present invention. Remember, as shown in FIG. 2, feature 210, the user does have the option to enact or not enact the attachment tracking feature. If the determination in step 602 is that the user has not enacted the attachment feature, the method moves to step 604, which terminates the method. If the user does not want to use the email-tracking feature, then there is no need for the method of the present invention. If in step 602, the determination is that the user has enabled the attachment-tracking feature, the method moves to step 606, which starts or activates a proposed attachment-tracking applet. Once the attachment-tracking applet has been activated, the user has several options with regard to creating records for new email attachments, searching existing records or modifying existing records.

One path from step 606 is to move to step 608, which determines whether the user has saved any attachments present in any email documents. If the determination is that the user has saved attachments present in email documents, in step 610, the email client creates a record. This record comprises the name of the attachment and the location of attachment and/or path to the location were the attachment was saved. Also created in the record is an Object Linking and Embedding (OLE) link to the email document from which the email attachment was downloaded. Once there has been a creation of the attachment name, attachment location, location path and link to the source email, the method moves to step 612 in which the email client notifies the Attachment Tracking applet of the event. The notification occurs in step 616 which will be discusses as part of FIG. 8. Step 612 also passes the newly created attachment record to the Attachment Tracking applet. Now that the attachment record has been created, step 614 makes a determination of whether the user has closed the email client. When the determination is that the user has closed the email client, the method terminates. If the determination of step 614 is that the user did not close the email client, the method returns to step 608.

Referring back to step 608, if the determination is that the user did not save any attachments present in any email document, the method moves to step 620. This step 620 make a determination of whether the user moved any email document from one folder or archive to another folder of archives Step 608 addresses the process of tracking the saving of an email attachment while step 620 addresses the process of determining whether a save email attachment has been moved from one location to another location. If the determination is that the user did not move any email document between folders, then the method returns to step 608. If the determination is that the user has moved an email attachment document between folders, the method moves to step 622. At this point, in step 622, the email client creates an Object Linking and Embedding (OLE) based document link of the email document being moved. The email client also creates a new OLE based document link to the email document of the new location of the email document. The method then moves to the previously discussed step 612 in which the email client notifies the Attachment Tracking applet of the event. As mentioned, this notification occurs in step 616. Step 612 also passes the newly created attachment record to the Attachment Tracking applet. Now that the attachment record has been created, step 614 makes a determination of whether the user has closed the email client. When the determination is that the user has closed the email client, the method terminates. If the determination of step 614 is that the user did not close the email client, the method returns to step 608.

FIG. 7 extends the method as described in FIG. 6. Referring to step 606, as previously mentioned, the method activates the proposed attachment tracking applet. At this point, the user can also have the option to view and edit existing records. If the user desires to review existing records, the method moves to step 700 of FIG. 7. In this step 700, the user is shown all operations supported by the Attachment Tracking Applet. The user has the option of selecting an operation to implement. These operations can include: 1) Viewing an Attachment Record; 2) Searching for an Attachment Record and 3) Modifying/Deleting an Attachment Record. After prompting the user, step 702 determines whether the user selected any operation. If the user does not select an option, this routine terminates. If the user did select an option, step 704 determines whether the selected option is for the user to view all attachment records. When the user does select this option, the method moves to step 708. This step fetches (retrieves) all records from the Persist storage database. The records are sequentially displayed in the format:

<name and location/path of the attachment file>

<document link to the e-mail>

At this point, step 710 determines whether the user clicked on the email link to view a record. Basically at this step 710, the applet will continuously monitor the user's action. When the user clicks on the <document link to the e-mail, which is the displayed email link, it will go to the next action in step 712, until then it will wait there for user action.) If the user did not click an attachment record, the method remains at step 710. When the determination in step 710 is that the user did click an attachment record, step 712 open the OLE link for that record which will directly open the corresponding e-mail document view the e-mail client. At this point, the user can review any information related to the particular e-mail attachment record. At the completion of the review, step 714 makes a determination of whether the user closed the Attachment Tracking Applet routine. Closing the Attachment Tracking Applet is an indication that the user has completed their activities. As a result, the routine terminates. If the determination of step 714 is that the user did not close the Attachment Tracking Applet, the method returns to steps 700 and 702 where the user will have the opportunity to select another operation.

Referring back to step 704, the user did not select the "View All" operation, the method moves to step 706 which makes a determination of whether the user selects the "Search" operation. When the determination is that the user did select the search operation the method moves to step 716. In this step, the user is allowed to enter the name of an attachment. A search of the storage database occurs for the attachment name entered by the user. At the completion of the search, the user is presented with the search results in the format:

<name of the document file>

<document link to the e-mail>

The routine next moves to step 710 as previously discussed. Again the user has the option of clicking on one of the records listed in the search results. If the user does select a record in step 710, step 712 opens the OLE link for that record which will directly open the corresponding e-mail document view the e-mail client. The user can review any information related to the particular e-mail attachment record. At the completion of the review, step 714 makes a determination of whether the user closed the Attachment Tracking Applet routine.

Referring back to step 706, if the determination is that the user does not select the search operation, the method moves to step 718. In this step, there is a determination of whether the user selected the "Modify/Delete" operation. First, if the user did not select this operation, the conclusion will be that the user did not select any option. As a result, the method returns to steps 700 and 702. If the user did choose the select the "Modify/Delete" operation, the method moves to step 720. In this step 720, the use is presented with all e-mail attachment tracking records with an option to modify or delete the record. Step 722 determines whether the user selected the modify operation. When the user has selected to modify a record, step 724 presents the user with the existing record details and allows the user to modify the record as desired. At the completion of the modification, in step 726, the user will have the opportunity to accept the changes. When the changes are accepted, the modified record is stored in the persistent storage database. When this modification operation is completed the routine terminates.

Referring to step 722, if the determination is that the user did not choose the modify operation, the method moves to step 728 which makes a determination of whether the user wants to choose the "Delete" operation. If the determination of step 728 is that the user did not choose the "Delete" operation, the method returns to step 720. If in step 728, the determination is that the user did choose the "Delete" operation, the method moves to step 730. In this step 730, the user selected entry from the persistent storage is deleted and the view of the data records is refreshed to indicate that the selected record has been deleted from the database. At this point, the routine can terminate or move to other locations or steps in the routine. One possible return point could be step 720.

Referring again to FIG. 6, in step 612 the email client notifies the Attachment Tracking applet of the event. FIG. 8 provides a detailed routine of this notification process. In this notification routine, in step 800, the proposed attachment tracking applet waits for a notification from an email client. When the attachment tracking applet of step 800 detects an event, the routine moves to step 802 which makes a determination of whether the detected event is a notification from the email client. If the determination is that the detected event is not a notification from the email client the routine returns to the monitoring state in step 800. When the determination in step 802 is that the email client did send a notification, the routine moves to step 804, which determines whether the notification is because of a new record entry. If the notification is a new record entry, step 806 appends the passed record to its persistent storage and refreshes the view of the database to include the newly created record entry. Step 808 then terminates the routine.

Referring back to step 804, if the determination is that the notification is not for a new record entry, then the routine moves to step 810, which determines whether the notification is because of changes in the email document link. This notification is triggered when the user moves the email, which originally contained a document attachment between different email folders or email archive databases. If the determination is that the notification is not of changes in the email document link, then the routine moves back to steps 800 and 802. If in step 810, the determination is that the notification is for changes in the email document link, the routine moves to step 812 which searches all of the record entries to find is there are any records with matching document links. At the completion of the search in step 812, step 814 determines whether a matching record was found. If not matching record was found, the routine returns to step 810. If in step 814, a matching was found, the routine moves to step 816, which modifies the record with the new email document link. This information is stored in the persistent storage database.

Note that the novel and unique idea in this disclosure is to have automated, embedded & intelligent E-mail Attachment Vs E-mail Document manager which will automatically track email and their associated attachments and will assist users to locate email (email-chain/thread) from where the attachment originally came from, given the name of the saved attachment file. The proposed solution will drastically reduce the time to find the emails associated with the email attachments and will highly enhance user convenience and usability.

In the present invention, the user can actually map the files present on the local hard disk (with its full path) with the email which possible contained it. Most of the times one would want to refer to emails associated with the detached attachment, in later period of time. Hence there is a need to have a mapping between email attachments stored locally (on the local hard disk or on remote storage using distributed files systems like Network File System (NFS) or Andrew File System (AFS)) and the email/email-chain/email-thread it originated from, such that the user on a single click can open the email associated with the attachment he/she is referring to (irrespective of its age). This is being addressed by the any existing prior art.

It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape floppy disc, hard disk drive, RAM, and CD-ROMs.

We claim:

1. A method for automatically tracking email messages and email attachments for a particular email comprising:
   detecting the selection of an email message by a user;
   determining whether the email message has an attachment document;
   when the determination is that the email message does have an attachment document, prompting the user to determine whether the user wants to select the attachment document;
   when the determination is that the user has selected the detected email, prompting the user to select whether to save or open the attachment document;
   determining whether the user has selected to save or open the email attachment;
   when the determination is that user has selected to save the attachment document, saving the attachment document in a database location, creating a record for the attachment document, attaching e-mail information to a document file for that attachment document, the document file having a link between the attachment document and the original email message that contained the attachment document and when the determination is that the user did not select to save a selected attachment document, detecting the opening of an attachment document selected by the user and detecting a save attempt of that opened document; and
   saving the document file in a database location.

2. The method as described in claim 1 further comprising before said detecting the selection of an email message by a user, determining whether the user has enabled an attachment document tracking routine.

3. The method as described in claim 1 further comprising, when the determination is that the user did not select to save a selected attachment document, detecting an attempt to move an email document saved in one location to another location.

4. A method for automatically tracking email messages and email attachments for a particular email comprising:
   detecting an email attachment document in a received email message; prompting a user to select an action for the email attachment document;
   determining the action for the email attachment document that the user selected, wherein said action further comprises when the determination is the that the user do not saved any attachment present in any email document, determining whether the user moved any email document from one location to another location; and when the determination is that the user did move an attachment present in an email document, creating an Object Linking and Embedding (OLE) based document link to the email document being moved and creating a new Object Linking and Embedding (OLE) based document link to the new location of the email attachment document;
   creating a record for the email attachment document based on the detected action of the user, the created record containing a link between the email attachment document and the original email message that contained the email attachment document;
   saving the created email attachment record in a location in a database; and notifying an attachment tracking routine of the created record.

5. The method as described in claim 4 wherein said determining the action for the email attachment document that the user selected further comprising determining whether user saved any attachment present in any email document.

6. The method as described in claim 5 further comprising when the determination is that the user did save an attachment present in an email document, creating a name for the save attachment document and a location where the attachment document is stored (PATH/URL) and creating an Object Linking and Embedding (OLE) based document link to the email document from where the attachment document was downloaded.

7. The method as described in claim 4 wherein said notifying step further comprises notifying an attachment tracking routine of a user action of saving an attachment document present in an email or a user action of moving an attachment document from one location to another location.

8. The method as described in claim 4 wherein said determining the action for the email attachment document that the user selected further comprising providing the user with operations the user can perform using the attachment tracking routine.

9. The method as described in 8 wherein the operations from which the user can select include 'View All', 'Search' and 'Modify and Delete'.

10. The method as described in claim 9 further comprising:
determining whether user has selected the 'View All' operation;
when the determination is that the user has selected the 'View All' operation, retrieving all records from storage;
sequentially displaying the retrieved records to the user in the format of: <name of the attachment file><document link to the e-mail>; detecting whether the user selected one of the displayed records; and opening an Object Linking and Embedding (OLE) link that directly opens a corresponding email document.

11. The method as described in claim 9 further comprising:
determining whether user has selected the 'View All' operation;
when the determination is that the user has not selected the 'View All' operation, determining whether user has selected the 'Search' operation;
when the determination is that the user has selected the 'Search' operation, prompting the user to enter a name of an attachment, searching for the attachment name in the database and presenting the user with the results of the search in the format of: <name of the attachment file><document link to the e-mail>; detecting whether the user selected one of the displayed records;
and opening an Object Linking and Embedding (OLE) link that directly opens a corresponding email document.

12. The method as described in clam 11 further comprising:
when the determination is that the user has not selected the 'Search' operation, determining whether user has selected the 'Modify/Delete' operation; when the determination is that the user has selected the 'Modify/Delete' operation: retrieving all e-mail attachment tracking records with an operation to modify or delete;
presenting the user with all retrieved e-mail attachment tracking records with an operation to modify or delete;
determining whether the user has selected the modify record operation; when the determination is that the user has selected the modify operation, presenting the user with existing record details and allowing for modifications to a selected record; and
accepting changes from the user to a selected record; and storing the changes for that record in the database.

13. The method as described in claim 12 further comprising when the determination is that the user did not select the modify operation:
determining whether the user selected the delete operation;
deleting a user selected record entry from the database; and
refreshing the display of the records to indicate the deleted record.

14. The method of claim 4 further comprising after said notifying an attachment tracking routine of the created record:
determining at the attachment tracking routine whether an email client sent any notification;
when the determination is that an email notification was sent, determining if the notification is of a new record entry;
when the determination is that the notification is of a new record entry, appending the record to the database; and
refreshing the view of the record in the database.

15. The method as described in claim 14 further comprising when the determination is that the notification is not of a new record entry:
determining whether the notification is of changes in an email document link;
when the determination is that the change is in an email document link, searching all record entries in the database to determine if there is any record with a matching document link;
determining whether there was a matching record found during the search; and
modifying the found record with a new email document link; and storing the modified record in the database.

16. A computer program product stored in a computer readable storage medium for automatically tracking email messages and email attachments for a particular email comprising:
instructions prompting the user to select from operations which include 'View All', 'Search' and 'Modify and Delete';
instructions detecting an email attachment document in a received email message;
instructions prompting a user to select an action for the email attachment document;
instructions determining the action for the email attachment document that the user selected by providing the user with operations the user can perform using the attachment tracking routine;
instructions creating a record for the email attachment document based on the detected action of the user, the created record containing a link between the email attachment document and the original email message that contained the email attachment document;
instructions saving the created email attachment record in a location in a database; and
instructions notifying an attachment tracking routine of the created record.

17. The computer program product as described in claim 16 further comprising:
instructions determining whether user has selected the 'View All' operation;
when the determination is that the user has selected the 'View All' operation, instructions retrieving all records from storage;
instructions sequentially displaying the retrieved records to the user in the format of: <name of the attachment file><document link to the e-mail>;
instructions detecting whether the user selected one of the displayed records; and
instructions opening an Object Linking and Embedding (OLE) link that directly opens a corresponding email document.

18. The computer program product as described in claim 16 further comprising:

instructions determining whether user has selected the 'View All' operation;

when the determination is that the user has not selected the 'View All' operation, instructions determining whether user has selected the 'Search' operation;

when the determination is that the user has selected the 'Search' operation, instructions prompting the user to enter a name of an attachment, instructions searching for the attachment name in the database and instructions presenting the user with the results of the search in the format of: <name of the attachment file><document link to the e-mail>; instructions detecting whether the user selected one of the displayed records; and instructions opening an Object Linking and Embedding (OLE) link that directly opens a corresponding email document.

* * * * *